United States Patent
Miyoshi et al.

(10) Patent No.: US 11,231,866 B1
(45) Date of Patent: Jan. 25, 2022

(54) SELECTING A TAPE LIBRARY FOR RECALL IN HIERARCHICAL STORAGE

(71) Applicant: International Business Machines Corporation, Armonk, NY (US)

(72) Inventors: Hiroyuki Miyoshi, Kawasaki (JP); Hiroshi Araki, Yokohama (JP); Takeshi Ishimoto, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/935,389

(22) Filed: Jul. 22, 2020

(51) Int. Cl.
*G06F 3/06* (2006.01)

(52) U.S. Cl.
CPC .......... *G06F 3/0647* (2013.01); *G06F 3/0614* (2013.01); *G06F 3/0686* (2013.01)

(58) Field of Classification Search
CPC .... G06F 3/0647; G06F 3/0614; G06F 3/0686; G06F 3/0676; G06F 3/0682; G06F 3/0689; G06F 3/0613
See application file for complete search history.

(56) References Cited

U.S. PATENT DOCUMENTS

| | | | | |
|---|---|---|---|---|
| 6,505,216 B1 * | 1/2003 | Schutzman | ......... | G06F 11/1456 |
| 7,039,657 B1 | 5/2006 | Bish et al. | | |
| 8,527,561 B1 * | 9/2013 | Moody, II | ............. | G06F 3/0686 |
| | | | | 707/822 |
| 8,566,517 B1 * | 10/2013 | Sims | ........................ | G06F 3/065 |
| | | | | 711/111 |
| 9,213,496 B2 | 12/2015 | Gibble et al. | | |
| 10,073,631 B2 | 9/2018 | Hasegawa et al. | | |
| 10,452,305 B1 * | 10/2019 | Miyamura | ............ | G06F 3/0649 |
| 2005/0021591 A1 * | 1/2005 | Boyd | .................. | G06F 11/2056 |
| | | | | 709/200 |
| 2005/0117177 A1 * | 6/2005 | Niitsuma | ........... | H04N 1/32502 |
| | | | | 358/1.15 |
| 2005/0257082 A1 * | 11/2005 | Zohar | ................... | G06F 3/0683 |
| | | | | 714/6.23 |
| 2007/0083727 A1 * | 4/2007 | Johnston | ............... | G06F 3/0635 |
| | | | | 711/170 |
| 2008/0016390 A1 * | 1/2008 | Cannon | ................. | G06F 3/0613 |
| | | | | 714/6.12 |
| 2008/0244174 A1 * | 10/2008 | Abouelwafa | ........... | G06F 3/065 |
| | | | | 711/114 |
| 2009/0300283 A1 * | 12/2009 | Kudo | .................... | G06F 3/0689 |
| | | | | 711/114 |

(Continued)

OTHER PUBLICATIONS

Cavalli et al., "StoRM-GPFS-TSM: a new approach to Hierarchical Storage Management for the LHC experiments", 17th International Conference on Computing in High Energy and Nuclear Physics (CHEP09), Journal of Physics Conference Series 219, Published 2010, 7 pages.

*Primary Examiner* — Khoa D Doan
(74) *Attorney, Agent, or Firm* — Donald J. O'Brien

(57) ABSTRACT

Embodiments are disclosed for a method for a tape library in hierarchical storage. The method includes receiving a recall request for a recall file having two copies stored in two tape libraries that are performing two migrations of two sets of files. The method also includes determining two migration progress values corresponding to the two migrations. Additionally, the method includes assigning the recall request to one of the two tape libraries having a greater value of the two migration progress values.

17 Claims, 7 Drawing Sheets

(56) References Cited

U.S. PATENT DOCUMENTS

| | | | |
|---|---|---|---|
| 2010/0103549 A1* | 4/2010 | Murayama | G06F 3/0613 360/15 |
| 2011/0078112 A1* | 3/2011 | Takata | G06F 16/1748 707/622 |
| 2011/0179222 A1* | 7/2011 | Iwasaki | G06F 3/0686 711/111 |
| 2013/0227180 A1* | 8/2013 | Bisht | G06F 3/0659 710/39 |
| 2013/0326136 A1* | 12/2013 | Carter | G06F 3/0631 711/111 |
| 2014/0344516 A1* | 11/2014 | Sims | G06F 3/065 711/111 |
| 2016/0216892 A1* | 7/2016 | Ngo | G06F 3/061 |
| 2016/0246587 A1* | 8/2016 | Uchiyama | G06F 8/65 |
| 2017/0357451 A1* | 12/2017 | Hasegawa | G06F 3/0605 |
| 2018/0018115 A1* | 1/2018 | Ikegame | G06F 3/0619 |
| 2019/0310789 A1 | 10/2019 | Miyoshi et al. | |
| 2019/0361622 A1* | 11/2019 | Hasegawa | G06F 3/0607 |
| 2020/0167091 A1* | 5/2020 | Haridas | G06F 3/0685 |
| 2021/0064298 A1* | 3/2021 | Hasegawa | G06F 3/0611 |

* cited by examiner

SELECTING A TAPE LIBRARY FOR RECALL IN HIERARCHICAL STORAGE

BACKGROUND

The present disclosure relates to selecting a tape, and more specifically, to selecting a tape library for recall in hierarchical storage.

Hierarchical storage management (HSM) involves techniques for managing a relatively higher speed storage, such as flash storage, and a relatively lower speed storage, such as magnetic tape cartridges (tape). The speed of a storage can indicate how quickly data can be accessed. Thus, a high-speed storage can access data in less time than a low-speed storage. In HSM, a controller can move relatively less frequently accessed files in flash storage to tape to make room for more relatively more frequently accessed files. In this way, the HSM can improve the efficiency of data retrieval because more frequently accessed data files are stored on the storage with relatively lower access times.

SUMMARY

Embodiments are disclosed for a method for a tape library in hierarchical storage. The method includes receiving a recall request for a recall file having two copies stored in two tape libraries that are performing two migrations of two sets of files. The method also includes determining two migration progress values corresponding to the two migrations. Additionally, the method includes assigning the recall request to one of the two tape libraries having a greater value of the two migration progress values.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
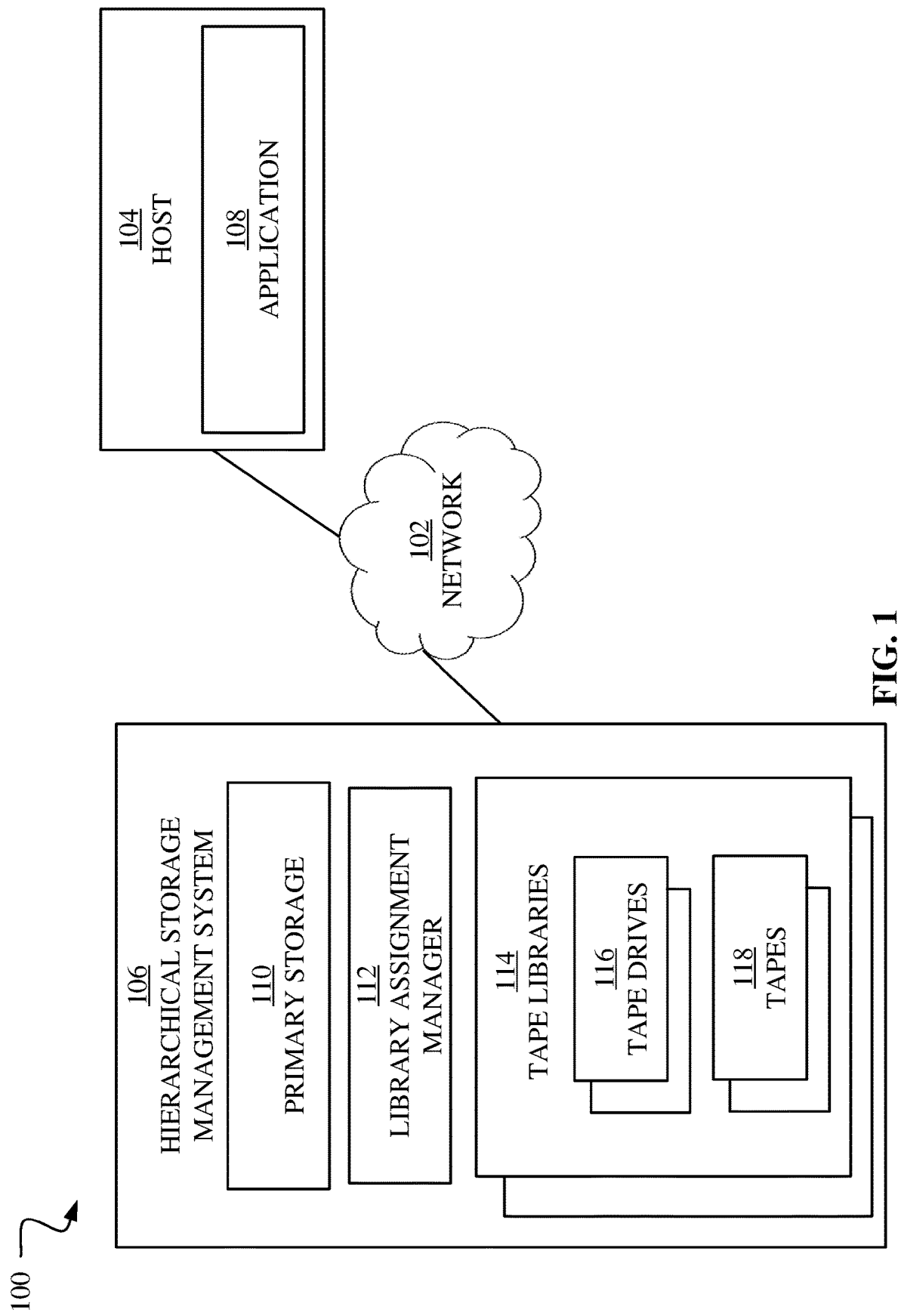
FIG. 1 is a block diagram of an example system for selecting a tape library for recall in hierarchical storage, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

Hierarchical storage management (HSM) can reduce the total cost of ownership (TCO) by storing relatively frequently accessed data in fast Flash/HDD media and relatively less frequently accessed data in tapes. Thus, HSMs can migrate files in flash storage to tape drives and recall files on tape drives back to flash storage. Additionally, HSM manages such data placement transparently and automatically. It can be useful to maintain relatively faster recall times because if recall is too slow, applications waiting for the recalled data files may timeout. Also, it can be useful to maintain relatively faster migration times because if migration is too slow, the owner of the HSM may incur greater costs in reducing migrations by purchasing more Flash/HDD spaces or tuning the data ingestion amount to the storage system. Tuning the data ingestion amount can involve pacing the amount of data that an application creates.

A user, such as a computer program, can create a file in flash storage. As access frequency to the file drops, the HSM can migrate the file to a magnetic tape. In HSM, the flash file is replaced with a small stub file and the file data is moved to tape. The file attributes and the extended attributes remain in the flash storage even when the file is replaced with the stub file. In this way, it appears to the user that the file is not moved. However, when the user reads the migrated file, the HSM recalls the file from tapes before providing data to the user.

The HSM can store magnetic tapes in tape libraries. In some cases, the tape libraries may provide redundancy for migrated files. Redundancy can mean that multiple copies of the same file can be stored on magnetic tapes in two or more tape libraries. Redundancy is useful for disaster recovery operations, such as when a building housing a tape library is destroyed in a fire or natural disaster. In such a case, a second tape library storing copies of the files in the destroyed tape library can provide a back-up for the lost files.

To recall a file that has been redundantly copied to pools in two libraries, the HSM can select one tape from one of the two libraries, recall the file from the selected tape, and allow the user to read from the recalled file. Current systems can select resources for recall as follows: If the tape to recall is already mounted in one of the drives in either one of the libraries, the HSM can use the mounted tape, thus reducing tape mount. The term, tape exchange, refers to a process involving exchanging tapes between two drives or exchanging tapes between a drive and a home slot. In contrast, moving a tape in the home slot to an empty drive is referred to as a mount or load. Further, moving a tape in a drive to a home slot is referred to as unmounting or unloading. In cases where the tape drive already has a mounted tape, the tape exchange also involves unmounting the tape from the tape drive and mounting a different tape on the drive. Such a process can incurs delays on multiple users, and drive up the TCO.

In an HSM with two tape libraries, the tape-libraries may be predefined as primary and secondary. The primary and secondary designation can mean that the primary pool is selected first and the secondary pool is used when access to the primary pool fails.

In some scenarios, the HSM can receive a recall request in the midst of performing relatively large numbers of migrations. However, some HSMs can process recalls with a higher priority than migrations. Since the recall has higher priority, if the tape or drive that is needed for recall is being used by migration, the HSM may wait until the migration can be interrupted before performing the recall. Thus, the recall is processed by interrupting the migrations. Further, if the recall tape is not mounted, the tape exchange occurs.

If multiple recalls occur while migrating to two library pools, the recalls may become concentrated on one library, potentially causing relatively frequent tape exchanges. As a result, the copy operation can take longer in the library where the recalls are taking place than the copy operation in the other library, where none of the recalls are taking place. Migration operations can include the file copying and file stubbing. Until the stubbing is done, the file migration is not complete. The stubbing is the function that frees up the flash storage space (and changes the status of files to be migrated). The status update is transparent to the user. However, the delay in starting the stubbing process can result in a relatively long delay for the entire migration process to complete. Thus, from a user point of view, the flash storage does not become available in a timely manner.

Further, some HSMs can break down migration data copies into multiple smaller workloads to allow for relatively more frequent migration interrupts for recalls. Thus, because the copy task on one library may take a relatively longer time due to the recall interrupts, the entire migration process may take a relatively long time since the stubbing is blocked until the copy task on all libraries is complete. However, if the migration takes a long time, the flash storage cannot be freed, which can result in a greater demand for expensive flash storage. One possible way to avoid this problem is to proceed to the stubbing when the data copy to one of the libraries is completed and then, later, copy the data from the library one tape to the library two tape. However, copying from library to library involves two tape drives, which is inefficient from a resource utilization point of view. More specifically, the amount of tape I/O increases and the performance can degrade as a whole.

Accordingly, some embodiments of the present disclosure can provide tape selection techniques for recalls when migration and recall occurred at the same time in an HSM with multiple tape libraries. In this way, some embodiments of the present disclosure can improve migration performance of the HSM. In addition to the conventional method of using an already-mounted tape for recall, the HSM can consider the migration data copy progress between the libraries. By executing recall interruption on a library where the migration data copy is relatively further ahead, instances of multiple recall operations can result in a more even distribution of the recall operations because each recall operation delays the progress of the migration operation in one library. As such, the progress of the copy migration in the other tape library is greater when the next recall operation occurs. Thus, the library assignment manager can select alternating tape libraries for subsequent recall operations. In this way, the HSM can avoid scenarios where recalls concentrate in one library. Accordingly, some embodiments of the present disclosure can improve migration performance interrupted by multiple recall operations.

FIG. 1 is a block diagram of an example system 100 for selecting a tape library for recall in hierarchical storage, in accordance with some embodiments of the present disclosure. The system 100 includes a network 102, host 104, and hierarchical storage management (HSM) system 106.

The network 102 may include one or more computer communication networks. An example network 102 can include the Internet, a local area network (LAN), a wide area network (WAN), a wireless network such as a wireless LAN (WLAN), or the like. Network 102 may comprise copper transmission cables, optical transmission fibers, wireless transmission, routers, firewalls, switches, gateway computers and/or edge servers. A network adapter card or network interface in each computing/processing device implemented as part of the host 104 and HSM system 106, for example, may receive messages and/or instructions from and/or through network 102, and forward the messages and/or instructions for storage or execution (or the like) to a respective memory or processor of the respective computing/processing device. Though network 102 is depicted as a single entity in FIG. 1 for purposes of illustration, in other examples network 102 may include a plurality of private and/or public networks over which the components of the system 100 may communicate.

The host 104 can be a computing device having a computer processor and memory for executing an application 108. The application 108 can be an executable computer application that performs one or more predefined functions on the host 104. The application 108 can read and write data via the HSM system 106.

The HSM system 106 includes a primary storage 110, library assignment manager 112, and multiple tape libraries 114. The HSM system 106 can be a data storage system that automatically moves data between relatively high cost (and high speed) and relatively low cost (and low speed) storage devices, such as primary storage 110 and tape libraries 114. The primary storage 110 can be a computer storage device, such as a flash storage and/or hard disk drives, for example which provides relatively high speed access for reading and writing relatively frequently accessed data.

Flash storage refers to a solid-state technology that uses flash memory chips for writing and storing data. Flash storage can include universal serial bus drives and enterprise-level arrays. Further, flash storage can achieve relatively fast response times (microsecond latency), compared to HDD with moving components. Further, flash storage uses non-volatile memory, which means that data is not lost when the power is turned off. Flash storage is also highly available and uses less energy and physical space than mechanical disk storage, such as HDD. While HDD is slower than flash storage, HDD is faster than tape storage.

In comparison to the primary storage 110, the tape libraries 114 can provide relatively low speed access to data stored on tapes 118, and long-term storage for relatively infrequently accessed data. While maintaining data on the primary storage 110 can provide relatively high speed access to data, this can be a costly form of storage. Accordingly, the HSM system 106 can store the bulk of the enterprise's data on slower devices, such as the tapes 118, and then copy data to the primary storage 110 when the application 108 requests access to data stored on the tapes 118.

The tape libraries 114 can provide redundancy in the event that access to the tapes therein is disrupted. Disruptions can include a loss of power, network connectivity, and/or the tapes 118 themselves, for example. According to some embodiments of the present disclosure, the tape libraries 114 can include tape drives 116, and tapes 118. The tape drives 116 can be devices configured to read and write data to magnetic tape, such as the tapes 118. Accordingly, if the application 108 requests access to a file stored on tape 118, the HSM system 106 can recall the file with a request to the tape libraries 114 housing the tapes storing copies of the file. Similarly, the HSM system 106 can migrate a relatively infrequently accessed file to the tape libraries 114 to make room for a relatively more frequently accessed file in the primary storage 110. However, the tape drives 116 may be limited to process one mounted tape at a time for reading from and/or writing data thereon. Thus, it is possible that the tape drives 116 may have tapes 118 mounted to perform a migration when the HSM system 106 makes a request of the tape libraries 114 to recall a file. In such a scenario, it can be useful to select one of the tape drives 116 for the recall.

According to some embodiments of the present disclosure, the library assignment manager 112 can select one of the tape libraries 114 for the recall based on which of the tape drives 116 finishes the migration process before the other. For example, if a file to be recalled is stored in two tape libraries 114, and the tape drives 116 for both tape libraries 114 are currently performing migrations with mounted tapes, the library assignment manager 112 can compare the progress of each migration, and select the tape library that is closer to completing the migration process. Accordingly, the selected tape library can perform the recall process once the migration process finishes.

Figure 2:
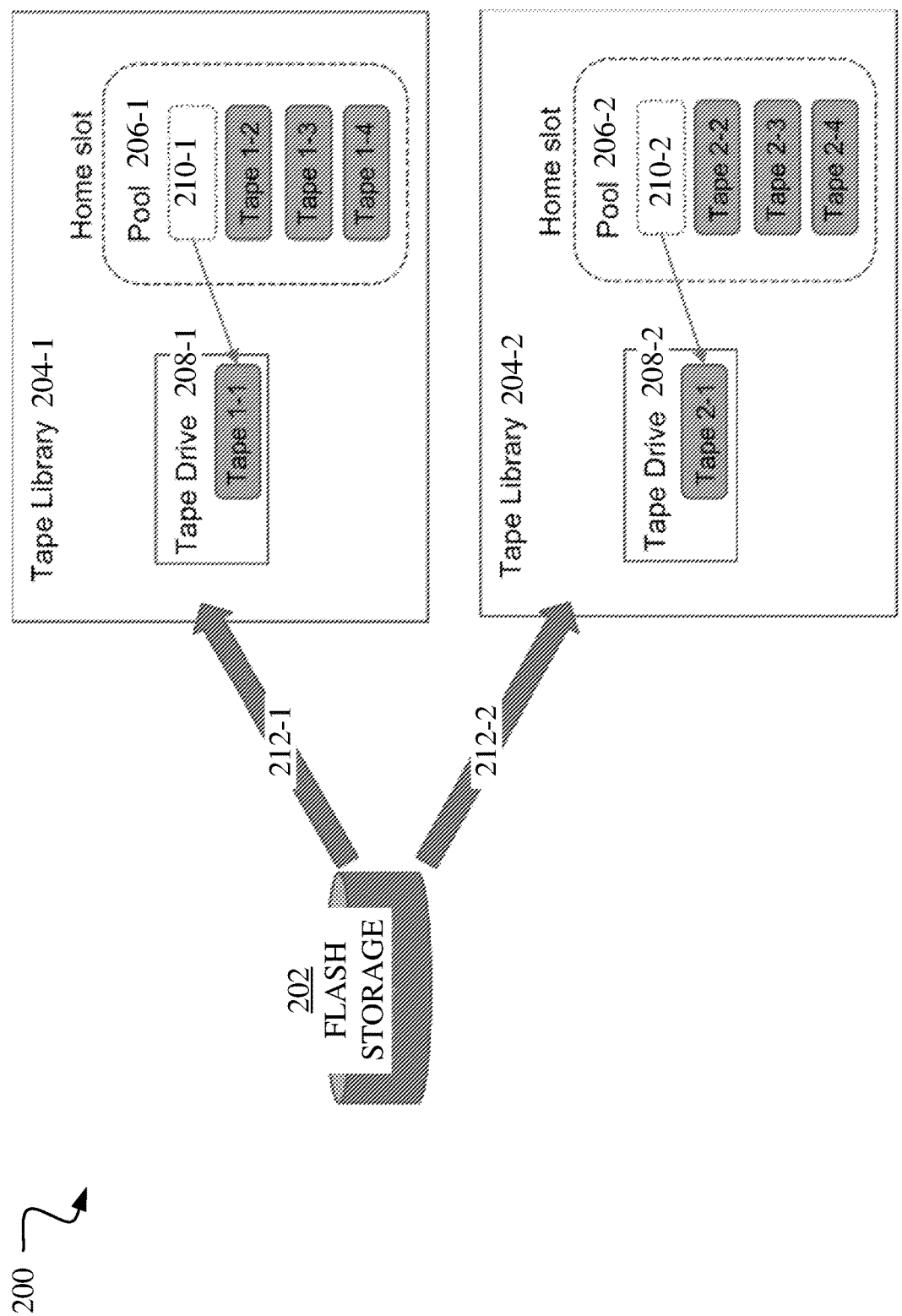
FIG. 2 is a block diagram of an example system for selecting a tape library for recall in hierarchical storage, in accordance with some embodiments of the present disclosure.

FIG. 2 is a block diagram of an example system 200 for selecting a tape library for recall in hierarchical storage, in accordance with some embodiments of the present disclosure. The system 200 includes a flash storage 202 and tape libraries 204-1, 204-2. The flash storage 202 and tape libraries 204-1, 204-2 may be similar to the primary storage 110 and tape libraries 114 described with respect to FIG. 1.

The tape library 204-1 includes a pool 206-1 and a tape drive 208-1. The pool 206-1 is a logical group of the magnetic tapes, i.e., physical tape cartridges. In this example, the physical tape cartridges are collectively referred to as the tapes 1, and include tapes 1-1, 1-2, 1-3, 1-4. The tapes 1 are similar to the tapes 118. In some embodiments, the tape-library 204-1 can include more than one pool. In this example, the tape drive 208-1 is associated with a home slot 210-1. The home slot 210-1 is where the tapes 1 may sit, and when a specific tape is requested to be loaded in the tape drive 208-1, a tape library media changer (not shown) can pick up the specific tape and load the specific tape on the tape drive 208-1. The home slot 210-1 can represent a physical position within the tape library 204-1 from which the tape library 204-1 can retrieve and mount the assigned tape to the tape drive 208-1. In this example, the tape library 204-1 has mounted the tape 1-1 to the tape drive 208-1. The tape drive 208-1 can be similar to the tape drives 116.

The tape library 204-1 can mount the tape 1-1 to perform a migration of a file from the flash storage 202. The migration can involve copying the migrating file from the flash storage 202 to the tape 1-1. Additionally, the migration can involve a redundancy operation wherein a second tape library, e.g., tape library 204-2, creates a copy of the migrating file. The arrows 212-1, 212-2 represent the operations of the migration. The tape library 204-2 can be similar to the tape library 204-1. Thus, the tape library 204-2 includes a pool 206-2 and tape drive 208-2. In this example, the tape library 204-2 has mounted the tape 2-1 from the home slot 210-2. Accordingly, during migration, the tape drive 208-2 can copy the migrating file to the tape 2-1.

According to some embodiments of the present disclosure, an HSM system, such as the HSM system 106 described with respect to FIG. 1, can also make a recall request to the tape libraries 204-1, 204-2 during the migration. Further, the tapes 1-1, 2-1 may each store a copy of the recall file. Thus, because both tape 1-1 and tape 2-1 contain the recall file, the recall operation can be performed in either of the tape libraries 204-1, 204-2. As stated previously, the tape libraries 204-1, 204-2 may run recall operations with a higher priority than migration operations. As such, the tape libraries 204-1, 204-2 can interrupt the migration operation in order to perform the recall operation. According to some embodiments of the present disclosure, the library assignment manager 112 can select which migration process to interrupt in a way that reduces the amount of time that the respective tape library takes to perform the recall operation.

The tape that has the file data to recall can be in a drive 208 or in a home slot 210. If a drive 208 is available in a library 204 and the tape to recall is in a home slot 210, then the tape library media changer can select the tape to load in the available drive 208. However, when the migration copy task is running and all of the available drives are being used, the migration can be paused. One tape-drive pair, e.g., tape 1-1, drive 208-1, can be freed and used for recall. If the tape to recall, e.g., tape 1-2 is in the home slot 210-1, then the tape exchange occurs (meaning tape 1-1 is moved from drive 208-1 to home slot 210-1 and tape 1-2 is moved from home slot 210-1 to drive 208-1). For example, the library assignment manager 112 can determine the progress of the individual file copies being performed on the tapes 1-1, 2-1. Further, the library assignment manager 112 can compare the progress of each copy and select the tape library for the recall operation based on which of the file copies has made greater progress. In some embodiments, as the migration operation copies the same data to both libraries 204-1, 204-2, the library assignment manager 112 can compare the progress made based on the ratio of the file copies completed with respect to the total number of files being migrated. In some embodiments, the comparison can be based on the rate of copy completion. The rate of copy completion can be represented as megabytes per second, for example. Thus, the library assignment manager 112 can select the tape library with the faster completion rate. Also, given that the same files are copied in the same order to both libraries 204, the number of files that the copy has completed can be tracked for each library 204 and used for comparison.

In this way, the library assignment manager 112 can make it possible to prevent a scenario where recall operations occur on one library in a concentrated manner. Because a migration command may not complete until copies to both libraries 204-1, 204-2 complete, the library assignment manager 112 can thus prevent a delay in file stubbing when the file copies in the migration to the other library have yet to be completed.

In the event that the recall file is on a tape that is not mounted on the tape drive, the tape library can perform a tape exchange. A tape exchange can involve dismounting a first tape from the tape drive, and mounting a second tape. Thus, a recall operation can involve interrupting a migration operation, dismounting a first tape used for the migration, and mounting a second tape storing the recall file. However, tape exchanges can be costly in terms of the time involved in mounting and dismounting tapes. Further, in current HSM systems, tape exchanges can become concentrated on one tape library, creating an imbalance in the amount of time the tape library takes to complete a migration. Advantageously, embodiments of the present disclosure can help distribute the occurrence of tape exchanges more evenly across tape libraries.

Figure 5:
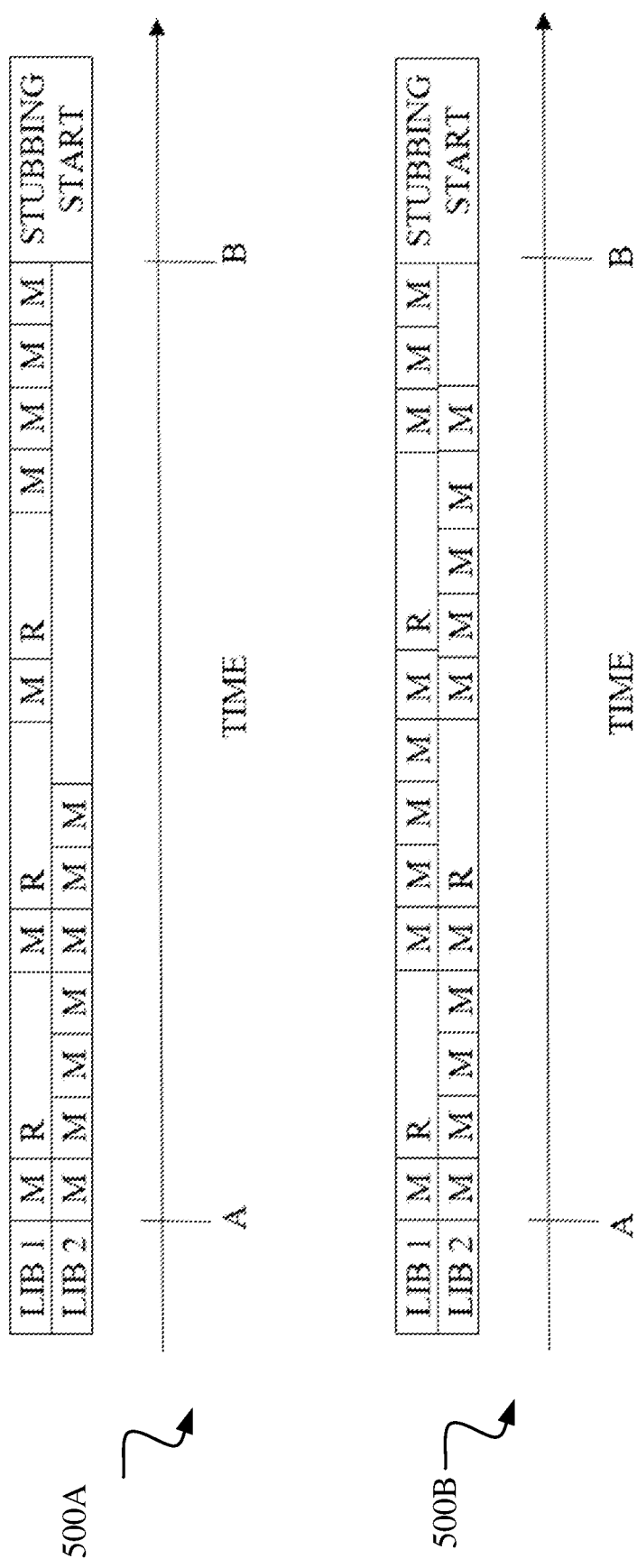
FIG. 5 is a block diagram of example timelines, in accordance with some embodiments of the present disclosure.

FIG. 5 is a block diagram of example timelines 500A, 500B, in accordance with some embodiments of the present disclosure. The example timelines 500A can represent the imbalance of tape exchanges in current HSM systems. As shown, the example timeline 500A includes a table with one row for each tape library 114, "LIB 1" and "LIB 2." In the table, each migration data copy workload is represented as "M," and each recall workload (including tape exchange time) is represented as "R." Further, the example timeline 500A includes points, "A," and, "B," which respectively represent the data copy start time and the data copy completion time. In this example, the recall workloads represent larger chunks of time than the migration workloads due to the extra time involved in tape exchanges. Because the recall operations tend to get concentrated on one tape library, the migration operation can take longer than with embodiments of the present disclosure. In contrast to current HSM systems, example timeline 500B represents a resulting timeline using the library assignment manager 112 described herein.

In the example timeline 500B, the recall operations are more evenly distributed than the example timeline 500A, thus reducing the total amount of time involved in the migration operation. As such, embodiments of the present disclosure can make it possible to start stubbing earlier than with current HSM systems, thus improving the performance of migration operations.

Figure 6:
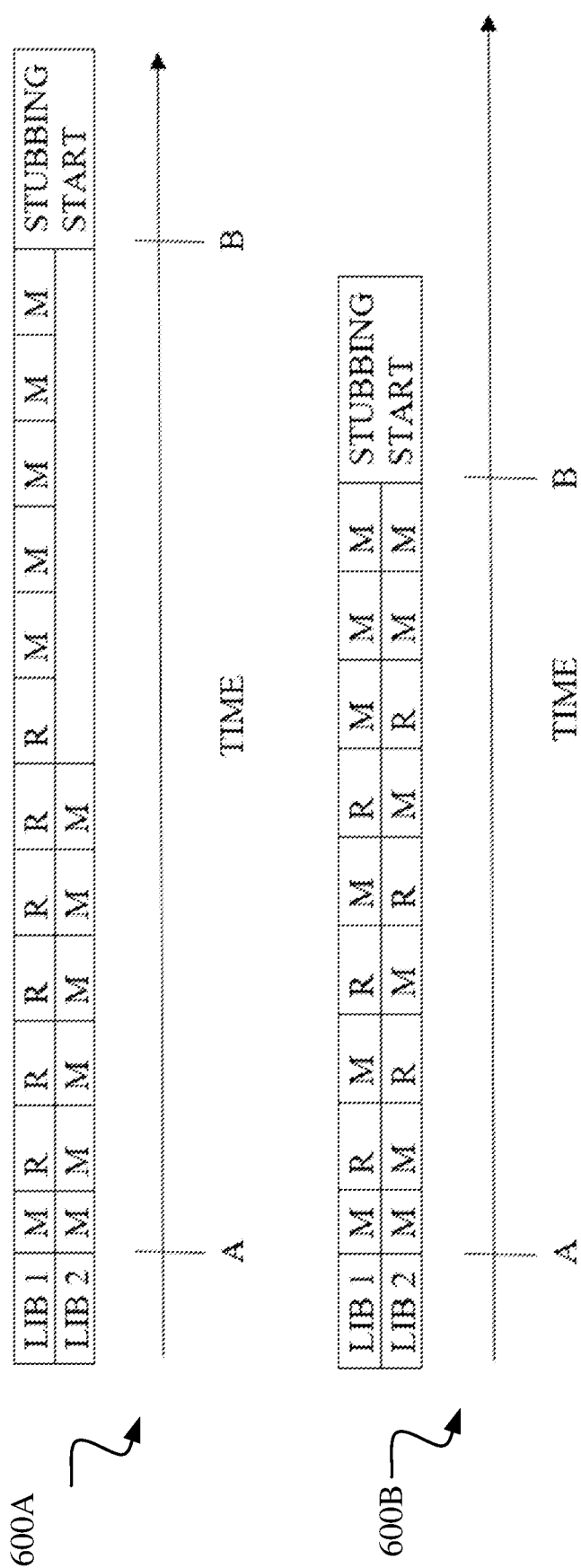
FIG. 6 is a block diagram of example timelines, in accordance with some embodiments of the present disclosure.

Similarly, embodiments of the present disclosure can also improve the performance of migration operations even when recall operations do not involve tape exchanges. FIG. 6 is a block diagram of example timelines 600A, 600B, in accordance with some embodiments of the present disclosure. The example timeline 600A can represent the resulting timeline for current HSM systems handling migration and recall operations without tape exchanges.

As shown, current HSM systems can concentrate the recall operations in one library, thus increasing the total amount of time involved in completing the migration operation. In contrast, example timeline 600B can represent the resulting timeline for performing migration and recall operations if the tape to recall is also mounted on Lib2.

In the example timeline 600B, the recall operations are more evenly distributed than the example timeline 600A, thus reducing the total amount of time involved in the migration operation. As such, embodiments of the present disclosure can make it possible to start stubbing earlier than with current HSM systems, thus improving the performance of migration operations.

Referring back to FIG. 2, the above-described examples of FIG. 2 represent one potential implementation with one tape drive usable for migration and recall operations in each library. This is similar to a round-robin approach, where each tape library takes alternating turns. However, the examples of FIG. 2 also assume the migration operations proceed at the same rate of progress between the libraries. Yet, the progress of migration operations may not be the same between tape libraries. As such, embodiments of the present disclosure can be more efficient than a round-robin approach.

For example, two libraries may have differences in the number of tape drives equipped or in the I/O performance of the tape drives. Therefore, one of the libraries may always be faster than the other in performing migration operations for the same number of files. Further, due to the differences in the workload between two tape libraries, the number of available tape drives can also differ. Examples of the workload include the following: A recall operation occurs with respect to a tape solely mounted in one library in which a migration operation is in progress and the migration operation for the library is interrupted; A customer may configure migration operations to solely take place in one library depending on the files to be migrated; Commands for tape management such as importing, exporting, reconciling, and reclaiming occupy a tape drive. These commands may take a certain time for execution. A library in which such a command is being performed has a reduced number of tape drives available for migration. When a failure, such as an I/O error occurs on one tape on which a write operation is in progress, the tape drive performs a recovery process. The recovery process may take several minutes, significantly slowing the migration operation. As such, a tape drive of one library becomes unavailable due to a failure. Also, the use or failure of the tape drives due to different workloads in a library can dynamically cause changes in the number of drives usable for migration while performing migration operation.

Figure 7:
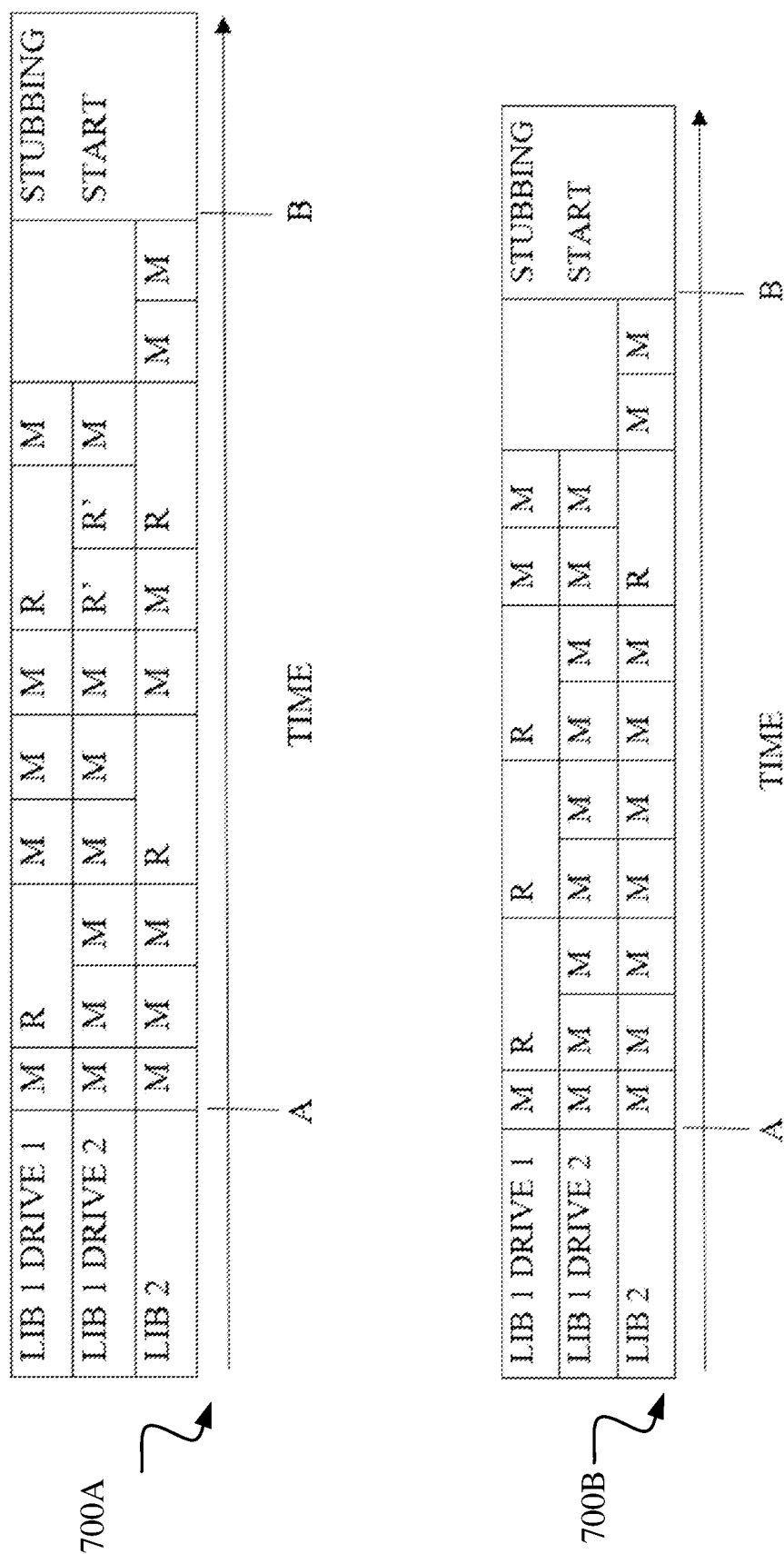
FIG. 7 is a block diagram of example timelines, in accordance with some embodiments of the present disclosure.

However, the round-robin method is blind to these potentially complicating factors, meaning a round-robin approach can result in the same types of imbalances demonstrated in example timelines 500A and 600A, described with respect to FIGS. 5 and 6, respectively 1. FIG. 7 is a block diagram of example timelines 700A, 700B, in accordance with some embodiments of the present disclosure. In an example scenario, a first tape library can have two tape drives that are always usable. Further, a second tape library two can have one tape drive which is always usable. In such a scenario, a round-robin approach can result in the timeline shown in example timeline 700A.

In the example timelines 700A, 700B 5 (and 6), the R' represents the recall from an already mounted tape. As shown, a round-robin approach alternates tape libraries for recalls even though the first tape library with two tape drives can complete its operations faster than the second. In contrast, embodiments of the present disclosure, which take into account the progress of each file copy of the migration can result in the timeline shown in example timeline 700B.

Thus, in this scenario, embodiments of the present disclosure can enable the migration operation to proceed to the file stubbing before a round-robin approach would. Accordingly, embodiments of the present disclosure can provide more efficient migration and recall operations than a round-robin approach.

Figure 3:
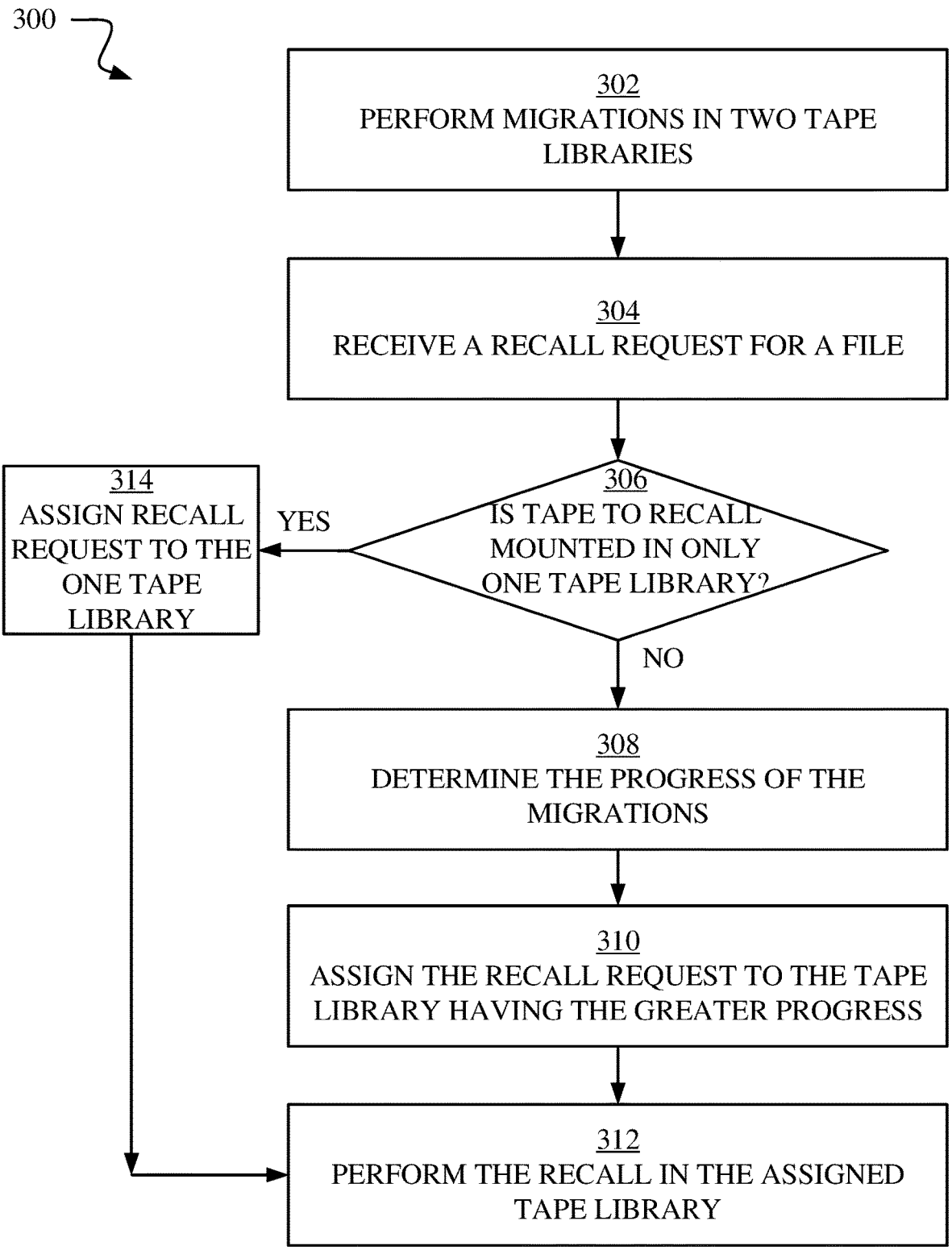
FIG. 3 is a process flow chart of a method for selecting a tape library for recall in hierarchical storage, in accordance with some embodiments of the present disclosure.

FIG. 3 is a process flow diagram of a method 300 for selecting a tape library for recall in hierarchical storage. The method 300 can be performed by an HSM system and a library assignment manager, such as the HSM system 106 and library assignment manager 112 described with respect to FIG. 1.

At operation 302, the HSM system 106 can perform migrations of multiple files to multiple tape libraries. Each of the migrations can include data copying of multiple files to tapes in the specified tape libraries. Migration of a group of files to multiple pools in multiple tape libraries, can involve copying all migrating files from primary storage 110 to one or more tapes 118 in the specified pool. If multiple pools from multiple tape libraries 114 are specified, the data can be copied to tapes 118 in multiple libraries. When the data copy for all pools have completed, execute stubbing of the files. The stubbing deletes the data from disk and changes the file status to migrated.

At operation 304, the HSM system 106 can receive a recall request. The recall request can be for recalling a file having copies in both tape libraries 114.

At operation 306, the HSM system 106 identifies the tapes 118 where the recall file data is stored and checks the mounted state of the tapes on both libraries. If the tape to recall is already mounted on a tape drive in only one library, the HSM system selects the mounted tape in that library for recall. If tapes for recall are not mounted on tape drives 116 on any tape libraries 114 or if tapes 118 for recall are mounted on tape drives 116 on both tape libraries 114, the method 300 flows to operation 308.

At operation 308, the library assignment manager 112 can determine the progress of the data copying for migrations. The progress can be a numeric value representing the amount of copy completion rate such as MB/sec. In some embodiments, given that the order of files for the data copying is the same for all tape libraries 114, the progress can be the number of files that the copy has completed or the ratio of the number of the copy completed files to the number of requested files.

At operation 310, the library assignment manager 112 can assign the recall request to the tape library having the greater progress. In this way, if the HSM system 106 receives multiple recall requests to the tape libraries 114 performing the migrations, the recalls do not become concentrated with merely one of the tape libraries.

At operation 312, the assigned tape library performs the recall. If the assigned tape library has multiple tape drives 116, the tape drive 116 having the tape 118 storing the recall file is used for the recall.

If, at operation 306, the HSM system 106 determines that the tape for recall is mounted in only one library, the method 300 can flow to operation 314, where the HSM system 106 assigns the recall request to that library without checking the copy progress in order to avoid tape exchanges. Further, the method 300 can flow to operation 312, where the assigned tape library performs the recall.

Figure 4:
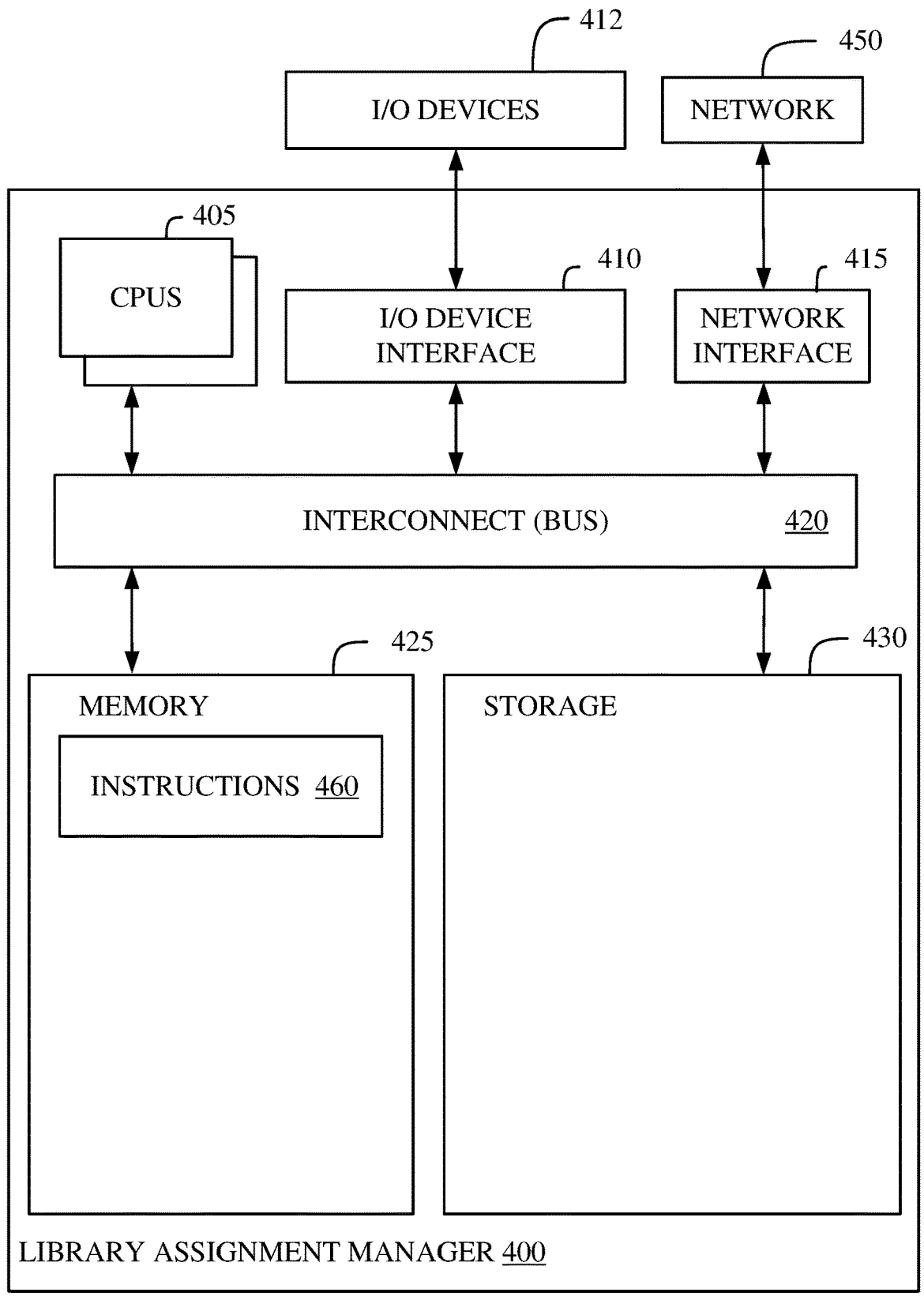
FIG. 4 is a block diagram of an example library assignment manager, in accordance with some embodiments of the present disclosure.

FIG. 4 is a block diagram of an example library assignment manager 400, in accordance with some embodiments of the present disclosure. In various embodiments, the library assignment manager 400 is similar to the library assignment manager 112 and can perform the method described in FIG. 3 and/or the functionality discussed in FIGS. 1 and 2. In some embodiments, the library assignment manager 400 provides instructions for the aforementioned methods and/or functionalities to a client machine such that the client machine executes the method, or a portion of the method, based on the instructions provided by the library assignment manager 400. In some embodiments, the library assignment manager 400 comprises software executing on hardware incorporated into a plurality of devices.

The library assignment manager 400 includes a memory 425, storage 430, an interconnect (e.g., BUS) 420, one or more CPUs 405 (also referred to as processors 405 herein), an I/O device interface 410, I/O devices 412, and a network interface 415.

Each CPU 405 retrieves and executes programming instructions stored in the memory 425 or the storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a CPU 405 can be a digital signal processor (DSP).

In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random access memory (e.g., static random access memory (SRAM), dynamic random access memory (DRAM), or Flash). The storage 430 is generally included to be representative of a non-volatile memory, such as a hard disk drive, solid state device (SSD), removable memory cards, optical storage, and/or flash memory devices. Additionally, the storage 430 can include storage area-network (SAN) devices, the cloud, or other devices connected to the library assignment manager 400 via the I/O device interface 410 or to a network 450 via the network interface 415.

In some embodiments, the memory 425 stores instructions 460. However, in various embodiments, the instructions 460 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all, any of the method described in FIG. 3 and/or the functionality discussed in FIGS. 1 and 2.

In various embodiments, the I/O devices 412 include an interface capable of presenting information and receiving input. For example, I/O devices 412 can present information to a listener interacting with library assignment manager 400 and receive input from the listener.

The library assignment manager 400 is connected to the network 450 via the network interface 415. Network 450 can comprise a physical, wireless, cellular, or different network.

In some embodiments, the library assignment manager 400 can be a multi-user mainframe computer system, a single-user system, or a server computer or similar device that has little or no direct user interface but receives requests from other computer systems (clients). Further, in some embodiments, the library assignment manager 400 can be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary library assignment manager 400. In some embodiments, however, individual components can have greater or lesser complexity than as represented in FIG. 4, components other than or in addition to those shown in FIG. 4 can be present, and the number, type, and configuration of such components can vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
  receiving a recall request for a recall file having two copies stored in two tape libraries performing two migrations of two pluralities of files;
  determining two migration progress values corresponding to the two migrations, wherein the two migration progress values comprise a ratio of files migrated compared to a total number of files of each of the two migrations; and
  assigning the recall request to one of the two tape libraries having a greater value of the two migration progress values.

2. The method of claim 1, further comprising performing a recall for the recall request using the assigned tape library.

3. The method of claim 1, further comprising assigning the recall request to a tape drive of the assigned tape library, wherein the tape drive has mounted a tape storing the recall file.

4. The method of claim 1, wherein the two migration progress values comprise a rate of migration of each of the two migrations.

5. The method of claim 1, further comprising performing a tape exchange on a tape drive of the assigned tape library.

6. The method of claim 1, wherein the two pluralities of files do not comprise the recall file.

7. A system comprising:
   a computer processing circuit; and
   a computer-readable storage medium storing instructions, which, when executed by the computer processing circuit, are configured to cause the computer processing circuit to perform a method comprising:
      receiving a recall request for a recall file having two copies stored in two tape libraries performing two migrations of two pluralities of files;
      determining two migration progress values corresponding to the two migrations, wherein the two migration progress values comprise a ratio of files migrated compared to a total number of files of each of the two migrations;
      assigning the recall request to one of the two tape libraries having a greater value of the two migration progress values; and
      performing a recall for the recall request using the assigned tape library.

8. The system of claim 7, the method further comprising assigning the recall request to a tape drive of the assigned tape library, wherein the tape drive has mounted a tape storing the recall file.

9. The system of claim 7, wherein the two migration progress values comprise a rate of migration of each of the two migrations.

10. The system of claim 7, the method further comprising performing a tape exchange on a tape drive of the assigned tape library.

11. The system of claim 7, wherein the two pluralities of files do not comprise the recall file.

12. The system of claim 7, the method further comprising pausing a migration of the assigned tape library.

13. A computer program product comprising program instructions stored on a computer readable storage medium, the program instructions executable by a processor to cause the processor to perform a method comprising:
   receiving a recall request for a recall file having two copies stored in two tape libraries performing two migrations of two pluralities of files;
   determining two migration progress values corresponding to the two migrations, wherein the two migration progress values comprise a ratio of files migrated compared to a total number of files of each of the two migrations;
   assigning the recall request to one of the two tape libraries having a greater value of the two migration progress values;
   pausing a migration of the assigned tape library; and
   performing a recall for the recall request using the assigned tape library.

14. The computer program product of claim 13, the method further comprising assigning the recall request to a tape drive of the assigned tape library, wherein the tape drive has mounted a tape storing the recall file.

15. The computer program product of claim 13, wherein the two migration progress values comprise a rate of migration of each of the two migrations.

16. The computer program product of claim 13, the method further comprising performing a tape exchange on a tape drive of the assigned tape library.

17. The computer program product of claim 13, wherein the two pluralities of files do not comprise the recall file.

* * * * *